B. COCK.
CHUCK.
APPLICATION FILED APR. 9, 1912.
1,062,223.  Patented May 20, 1913.
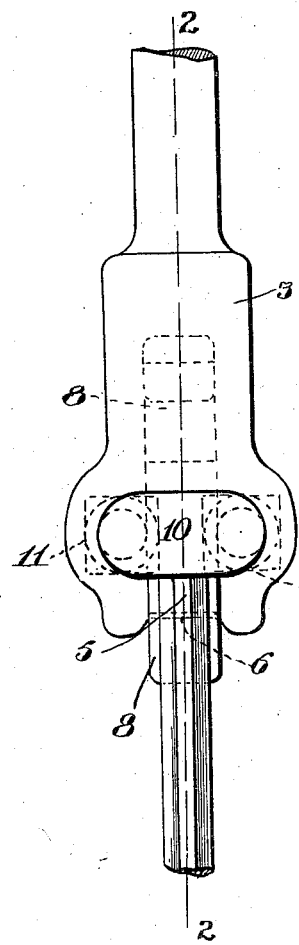
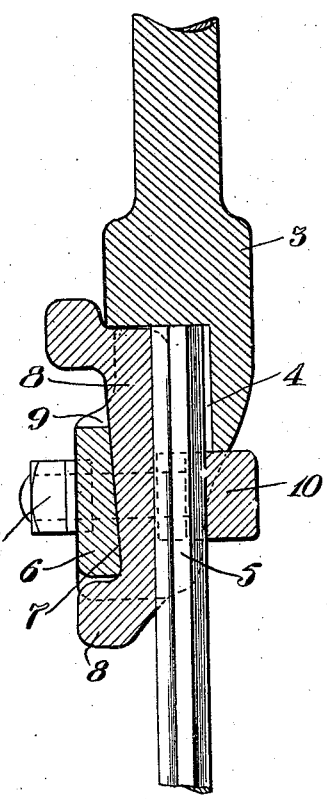
Attest:
Inventor:
Benjamin Cock
by Wm B. Whitney
Atty
COLUMBIA PLANOGRAPH CO., WASHINGTON, D. C.

UNITED STATES PATENT OFFICE.

BENJAMIN COCK, OF CAMBORNE, ENGLAND, ASSIGNOR TO HOLMAN BROTHERS, LIMITED, OF CAMBORNE, ENGLAND, A CORPORATION OF GREAT BRITAIN.

CHUCK.

1,062,223.  Specification of Letters Patent.  Patented May 20, 1913.

Application filed April 9, 1912. Serial No. 689,659.

*To all whom it may concern:*

Be it known that I, BENJAMIN COCK, a subject of the King of Great Britain, residing at Camborne, in the county of Cornwall, England, have invented new and useful Improvements in Chucks, of which the following is a specification.

My invention relates to chucks or tool-holders designed especially for holding the borers or drills of rock-drilling apparatus.

In the chucks for rock drills heretofore constructed the shank of the tool is introduced and held between a half-bushing placed in a longitudinal U-shaped recess formed in the piston-head and a wedge-pad or bushing with an inclined outer face which is adapted to slide longitudinally within a U-bolt or strap secured in the piston-head; and in order that the tools, the shanks of which as is well known vary in size, may be held in axial alinement with the chuck it is necessary to provide a half-bushing of suitable thickness for each different size of tool-shank.

The object of the present invention is to remedy this defect and to provide an adjustable bushing-chuck in which tools with shanks of different sizes may be secured and held in axial alinement without change or substitution of parts.

With this object in view my improved chuck comprises a head provided with a longitudinal recess to receive the shank of a tool, the bottom or one side of which recess has a surface inclined to the axis of the chuck, a wedge-bushing the oppositely inclined outer face of which rests upon the inclined wall of the recess, and means such as a U-bolt or strap adapted to secure the shank of the tool in the recess and against the plane inner face of the wedge-bushing.

One specific form of chuck embodying my invention is illustrated in the accompanying drawing in which—

Figure 1 is a plan, and Fig. 2 a section on the line 2 2 of Fig. 1, of the chuck.

Referring to the drawing, 3 is the piston-head and 4 is the longitudinal recess provided therein to receive the shank 5 of a borer or drill. The bottom or lower wall 6 of the recess has an inner face or surface 7 which is inclined to the axis of the head and this wall is cut away at the inner end of the recess to accommodate an outwardly extending projection or lug at the inner end of the wedge-bushing 8, the oppositely inclined outer face 9 of which rests upon or bears against the inclined wall of the recess. The tool is secured in place against the plane inner face of the wedge-bushing by the U-bolt or strap 10 which embraces the shank of the tool and the wedge-bushing and, passing through holes in the bottom wall of the recess, is secured thereto by the nuts 11.

With this construction the chuck can be utilized with facility for taking borers or tools having shanks of different sizes since to hold them approximately in axial alinement with the head it is only necessary to move the wedge-bushing backward or forward before tightening up the nuts on the U-bolt. Thus, in cases where drill-shanks of the larger size are used the wedge-bushing is pushed as far back as possible, whereas for the smaller shanks this bushing is brought forward for perhaps three-fourths of its travel. It will be understood that in either case the momentum acquired by the loose wedge-bushing during the operation of the drill will thrust it forward, thus serving to securely lock the borer or drill in position but having no appreciable effect as regards the alinement of the borer which is fixed by the adjustment of the nuts of the U-bolt.

In practice it will be found advantageous to make the U-bolt as a drop forging and to provide it with a large head which will serve also as a pad.

While I have shown and described my invention in what I now consider to be the best form for its embodiment, it will be understood that it may be variously modified in its several parts, within the scope of the appended claims, without departing from the spirit or sacrificing the advantages thereof.

What I claim as new, and desire to secure by Letters Patent, is—

1. A chuck or tool-holder which comprises a head provided with a longitudinal recess adapted to receive the shank of a tool and having one of its walls inclined to the axis of the chuck, a wedge-bushing adapted to rest and to move forward and backward upon the inclined wall of the recess, and means providing a bearing for the shank of the tool in the wall of the recess opposite said inclined wall and wedge-bushing which is fixed longitudinally but is transversely adjustable.

2. A chuck or tool-holder comprising a head provided with a longitudinal recess adapted to receive the shank of a tool one wall of which is inclined to the axis of the chuck and is cut away at the inner end of the recess, a wedge-bushing bearing against the inclined wall of the recess and having at its rear end a projection or lug extending outwardly through the opening in the wall or recess by which the forward movement of the bushing is limited, and a U-bolt adapted to embrace the shank of a tool and the wedge-bushing and to secure them to the inclined wall of the recess.

BENJAMIN COCK.

Witnesses:
W. J. ROBBINS,
F. K. BAKER.

---

Copies of this patent may be obtained for five cents each, by addressing the "Commissioner of Patents, Washington, D. C."